(12) United States Patent
Kim et al.

(10) Patent No.: US 6,929,392 B2
(45) Date of Patent: Aug. 16, 2005

(54) BACKLIGHT ASSEMBLY AND LIQUID CRYSTAL DISPLAY APPARATUS HAVING THE SAME

(75) Inventors: Kyu-Seok Kim, Yongin-si (KR); Ik-Soo Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/366,829

(22) Filed: Feb. 14, 2003

(65) Prior Publication Data

US 2003/0201702 A1 Oct. 30, 2003

(30) Foreign Application Priority Data

Apr. 26, 2002 (KR) ........................................ 2002-22958

(51) Int. Cl.⁷ ............................................... G02B 6/00
(52) U.S. Cl. ...................... 362/632; 362/561; 362/621
(58) Field of Search ........................ 362/31, 559, 560, 362/561, 365, 366, 27, 29, 30; 349/57, 58, 60, 61; 313/110, 634

(56) References Cited

U.S. PATENT DOCUMENTS

| | | | | |
|---|---|---|---|---|
| 6,273,577 B1 | * | 8/2001 | Goto et al. | 362/31 |
| 6,292,239 B1 | * | 9/2001 | Nagamura et al. | 349/58 |
| 6,369,866 B1 | * | 4/2002 | Rai et al. | 349/61 |
| 2002/0050974 A1 | * | 5/2002 | Rai et al. | 345/102 |

\* cited by examiner

*Primary Examiner*—Sandra O'Shea
*Assistant Examiner*—Guiyoung Lee
(74) *Attorney, Agent, or Firm*—Cantor Colburn LLP (57) ABSTRACT

A backlight assembly and an LCD apparatus capable of reducing power consumption and increasing brightness of a light. The backlight assembly includes a light guide plate for receiving an external light and an artificial light, a first receiving container for receiving the light guide plate and supplying the artificial light to the light guide plate, and a second receiving container for supplying the external light to the light guide plate, the second receiving container comprising an light side wall inclined to the light guide plate. The LCD panel assembly displays images using the external light and artificial light from the light guide plate.

24 Claims, 13 Drawing Sheets

BACKLIGHT ASSEMBLY AND LIQUID CRYSTAL DISPLAY APPARATUS HAVING THE SAME

BACKGROUND OF THE INVENTION

1. Field of the Invention

The present invention relates to a backlight assembly and an LCD (Liquid Crystal Display) apparatus, and more particularly to a backlight assembly capable of reducing power consumption and increasing brightness of a light and an LCD apparatus having the same.

2. Description of the Related Art

LCD apparatuses typically display information such as a character, a still picture, and a moving picture by using a liquid crystal in which light transmittance is varied in response to an intensity of an electric field. The LCD apparatuses perform display operation using a light, for example, an external light such as sunshine, an illumination, etc., or an artificial light.

LCD apparatuses include reflective LCD apparatuses and transmissive LCD apparatuses. The reflective LCD apparatuses display images using a reflective electrode in which sunshine or illumination is reflected to a liquid crystal. However, the reflective LCD apparatuses may not display the images where an amount of the external light is not enough to display the images.

The transmissive LCD apparatuses display images using a transparent electrode which transmits the artificial light generated by consuming an electric energy. The transparent electrode is made of ITO (Indium Tin Oxide) or IZO (Indium Zinc Oxide). Since the transmissive LCD apparatuses use only the artificial light to display the images, the transmissive LCD apparatuses consume a lot of power.

Recently, transreflective LCD apparatuses have been developed so as to solve disadvantages of the reflective LCD apparatuses and transmissive LCD apparatuses. The transreflective LCD apparatuses comprise a transparent electrode and a reflective electrode. The reflective electrode of the transreflective LCD apparatuses is disposed on the transparent electrode and includes an opening to partially expose the transparent electrode. The transreflective LCD apparatuses display images using an external light where an amount of the external light is sufficient for such display, while the apparatuses display the images using an artificial light where an amount of the external light is insufficient for display purposes.

However, the transreflective LCD apparatuses have a lower brightness as compared with those of the reflective LCD apparatuses and transmissive LCD apparatuses, while the transreflective LCD apparatuses can display images regardless of a presence of the external light.

SUMMARY OF THE INVENTION

The present invention provides a backlight assembly capable of reducing power consumption and increasing brightness of a light.

The present invention also provides an LCD apparatus having the backlight assembly. According one embodiment of the invention, a backlight assembly comprises a light guide plate comprising a first side surface for receiving an external light, a second side surface for receiving an artificial light, a third side surface and a fourth side surface for connecting the first side surface to the second side surface, a light reflecting surface for reflecting the external light and the artificial light, and a light emitting surface facing the light reflecting surface; a first receiving container for receiving the light guide plate and for supplying the artificial light to the second surface, the first receiving container comprising first to third sidewalls for covering the second to fourth side surfaces of the light guide plate; and a second receiving container having a bottom surface, fourth to sixth sidewalls for covering the first to third sidewalls, and a lighting sidewall for supplying the external light to the first surface, wherein the fourth to sixth sidewalls are extended from the bottom surface, and wherein the lighting sidewall is extended from the bottom surface, inclined with respect to the first side surface and connected between fifth and sixth sidewalls.

According to another embodiment of the present invention, a backlight assembly comprises a light guide plate comprising an external light-lighting body, the external light-lighting body comprising a light reflecting side surface for reflecting an external light from a first direction to a second direction, a light receiving surface for receiving an artificial light from a third direction, a light reflecting surface for reflecting the external light and artificial light to a fourth direction, at least one side surface adjacent to the light receiving surface, and a light emitting surface for emitting the external light and the artificial light having the fourth direction; a first receiving container comprising a first sidewall for covering the light receiving surface and the at least one side surface, wherein the first receiving container supplies the artificial light to the light receiving surface; a second receiving container comprising a bottom surface, a second sidewall extended from the bottom surface, and a lighting sidewall extended from the bottom surface and connected to the second sidewall, wherein the lighting sidewall is inclined with respect to the bottom surface; and a light reflecting means disposed over the lighting sidewall and bottom surface.

According to a further of the present invention, an LCD apparatus comprises a backlight assembly comprising a light guide plate for receiving an external light and an artificial light in different directions, a first receiving container for receiving the light guide plate and supplying the artificial light to the light guide plate, wherein the second receiving container comprises an lighting sidewall being inclined with respect to the light guide plate; an LCD panel assembly for converting the external light and artificial light into an image light having image information; and a chassis comprising a chassis body for exposing an effective display area of the LCD panel assembly and an external light-inducting window disposed on a portion of the chassis body corresponding to the lighting sidewall, wherein the chassis is combined to the second receiving container so as to fix the LCD panel assembly to the second receiving container.

Advantageously, the backlight assembly and LCD apparatus according to the present invention uses both an external light and an artificial light to display the image. Thus, to the backlight assembly and LCD apparatus may reduce power consumption and increase brightness of the light.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION OF THE INVENTION

Embodiment 1

Figure 1A:
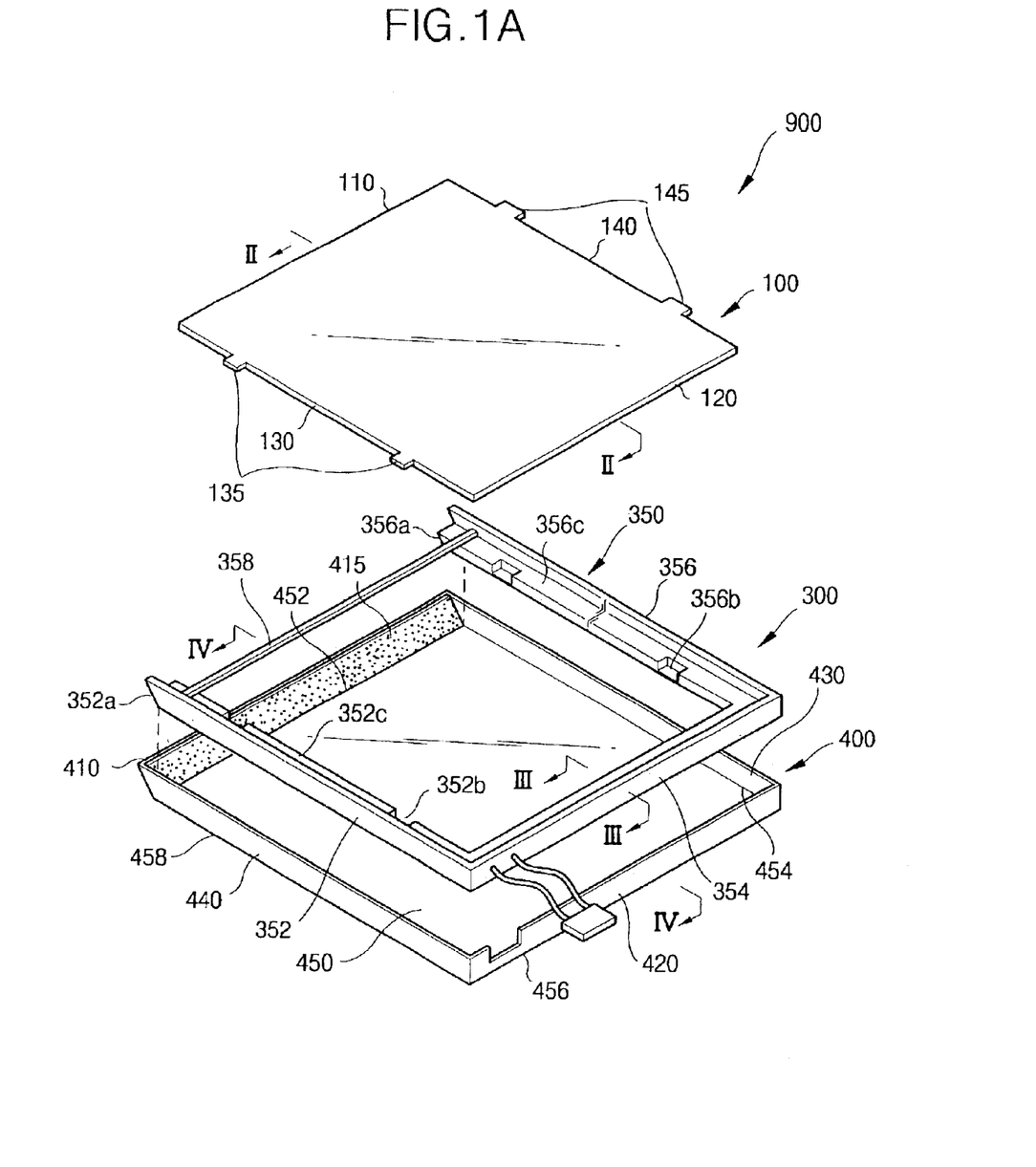
FIG. 1A is an exploded perspective view showing a backlight assembly according to a first embodiment of the present invention.
Figure 1B:
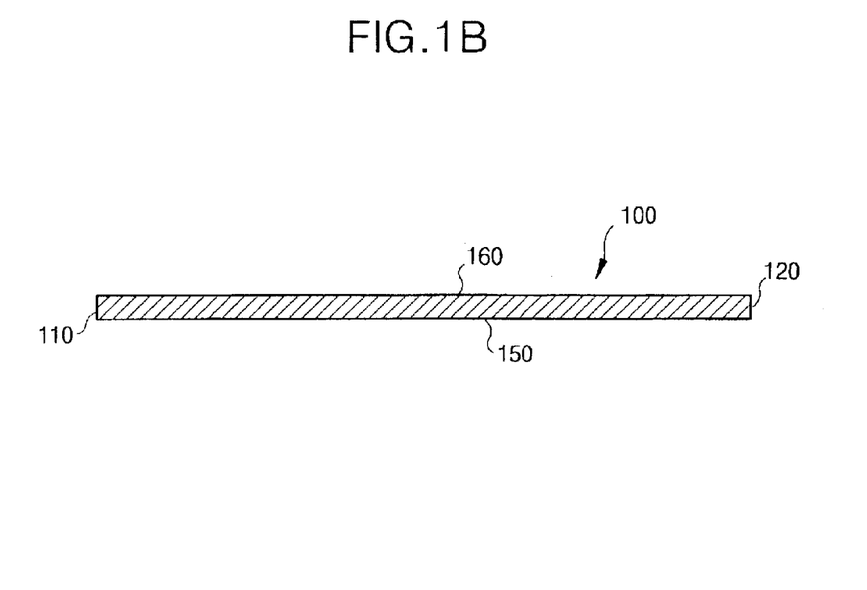
FIG. 1B is a cross-sectional view taken along the line II—II for showing the light guide plate shown in FIG. 1A.
Figure 1C:
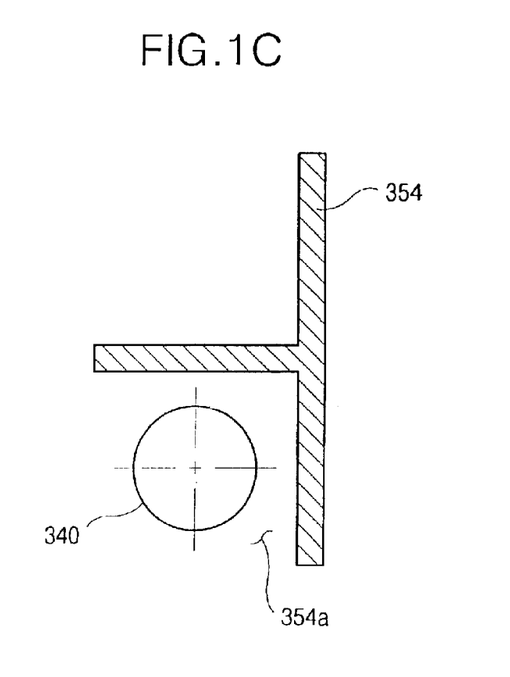
FIG. 1C is a cross-sectional view taken along the line III—III for partially showing the first receiving container shown in FIG. 1A.

FIG. 1A is an exploded perspective view showing a backlight assembly according to a first embodiment of the present invention. FIG. 1B is a cross-sectional view taken along the line II—II for showing the light guide plate shown in FIG. 1A. FIG. 1C is a cross-sectional view taken along the line III—III for partially showing the first receiving container shown in FIG. 1A.

Referring to FIGS. 1A to 1C, a backlight assembly 900 comprises a lamp 340 for generating a light, a light guide plate 100 for guiding a light, a first receiving container 300 for receiving the light guide plate 100 and lamp 340, and a second receiving container 400 for receiving the first receiving container 300 and for guiding an external light to the light guide plate 100.

The light guide plate 100 may have a rectangular parallelepiped. For example, the light guide plate 100 comprises first to fourth side surfaces 110, 120, 130 and 140, a light reflecting surface 150, and a light emitting surface 160. The first side surface 110 faces the second side surface 120, and the first and second side surfaces 110 and 120 are connected to each other by the third and fourth side surfaces 130 and 140.

The first side surface 110 receives the external light and the second side surface 120 receives an artificial light generated by consuming an electric energy. The external light supplied through the first side surface 110 and the artificial light supplied through the second side surface 120 are reflected from the light reflecting surface 150 and provided to the light emitting surface 160.

The third side surface 130 is provided with a first fixing protrusion 135 and the fourth side surface 140 is provided with a second fixing protrusion 145. The first and second fixing protrusions 135 and 145 are partially protruded from the third and fourth side surfaces 130 and 140, respectively. Each of the first and second fixing protrusions 135 and 145 has a pair of protrusions separated from each other.

The first receiving container 300 comprises a first receiving container sidewall 350 for covering the second to fourth side surfaces 120, 130 and 140, a first fixing recess 352b corresponding to the first fixing protrusion 135, a second fixing recess 356b corresponding to the second fixing protrusion 145.

The first receiving container sidewall 350 includes a first sidewall 352 for covering the third side surface 130, a second sidewall 354 for covering the second side surface 120, and a third sidewall 356 for covering the fourth side surface 140. The first, second and third sidewalls 352, 354 and 356 are stepped toward the third, second and fourth side surfaces 130, 120 and 140, respectively. Each of the first and third sidewalls 352 and 356 is provided with first and second steps 352c and 356c on which the first and second fixing recesses 352b and 356b are disposed, respectively.

The first receiving container 300 further includes a connection bar 358 for connecting the first and third sidewalls 352 and 356 to prevent an LCD panel from being moved. The connection bar 358 is disposed on the first and second steps 352c and 356c such that the connection bar 358 does not obstruct the light guide plate 100 to receive the external light through the first side surface 110.

As shown in FIG. 1C, the lamp 340 is adjacent to the second sidewall 354. For example, the lamp 340 is received in a lamp receiving space 354a provided with the second sidewall 354 of the first receiving container 350. The lamp 340 comprises a point light source such as a light emitting diode or a linear light source such as a cold cathode fluorescent lamp. The first receiving container 300 is received in the second receiving container 400. The second receiving container 400 fixes the light guide plate 100 and lamp 340 in the first receiving container 300 as well as supplies the external light to the light guide plate 100.

Referring to FIG. 1A, the second receiving container 400 comprises a bottom surface 450, fourth to sixth sidewalls 420, 430 and 440 (which correspond to the second, third and first sidewalls 354, 356 and 352), and a lighting sidewall 410. The second receiving container 400 is made of a metal material and the bottom surface 450 has a plate shape having first to fourth edge portions 452, 454, 456 and 458.

The fourth to sixth sidewalls 420, 430 and 440 are extended from the second to fourth edge portions 454, 456 and 458, respectively. For instance, the fourth to sixth sidewalls 420, 430 and 440 are extended until the heights of the fourth to sixth sidewalls 420, 430 and 440 are substantially identical to those of the first to third sidewalls 352, 354 and 356 of the first receiving container 300. Accordingly, each of the fourth to sixth sidewalls 420, 430 and 440 of the second receiving container 400 covers the second, third and first sidewalls 354, 356 and 352 of the first receiving container 300.

The lighting sidewall 410 is disposed at the first edge portion 452 and faces the first side surface 110 of the light guide plate 100. The lighting sidewall 410 is inclined with respect to the first side surface 110 toward the external.

Figure 2:
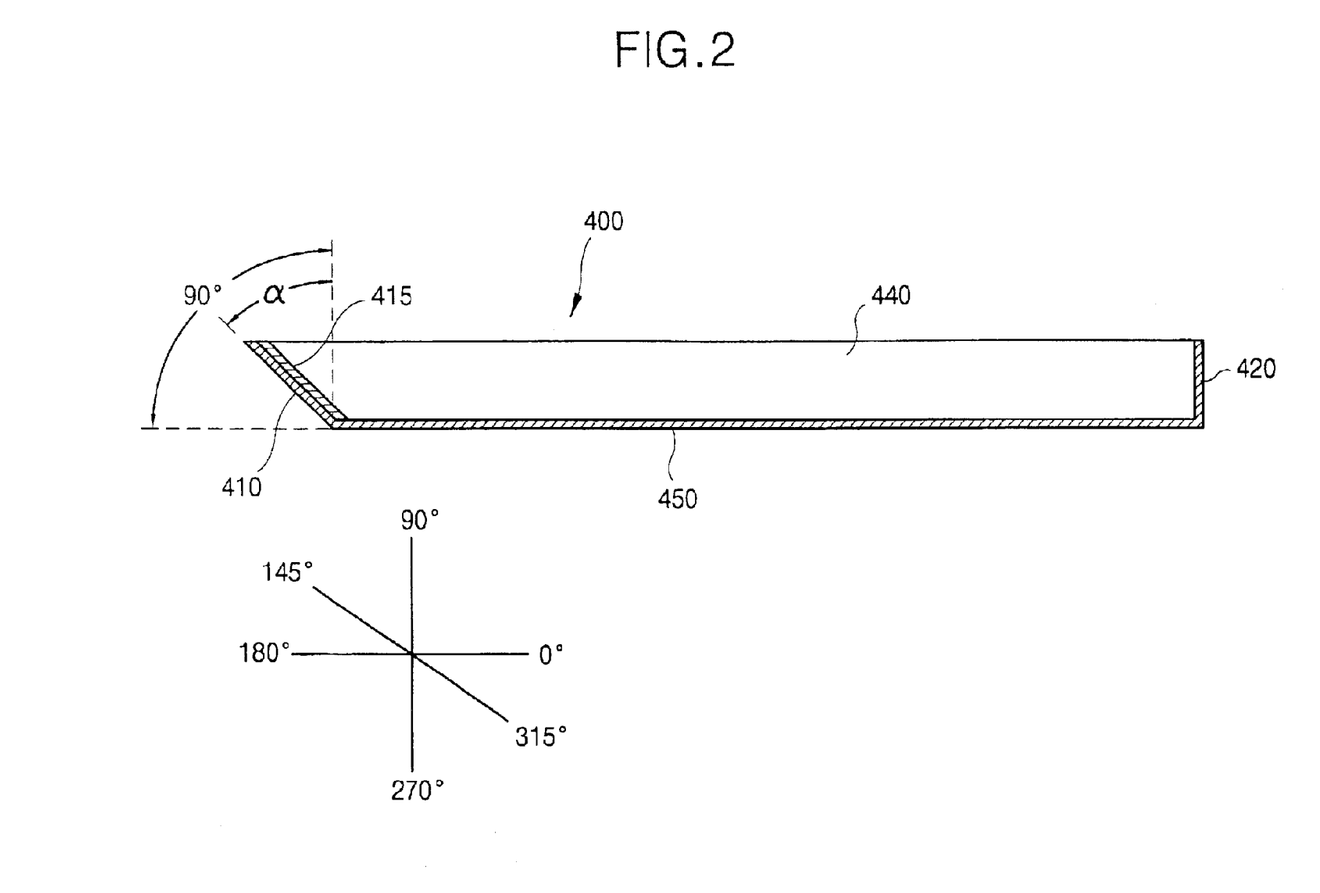
FIG. 2 is a cross-sectional view taken along the line IV—IV for showing the second receiving container shown in FIG. 1.

FIG. 2 is a cross-sectional view taken along the line IV—IV for showing the second receiving container shown in FIG. 1.

Referring to FIG. 2, an inclined angle "α" of the lighting sidewall 410 with respect to the first side surface 110 is more than about 0 degree and less than about 90 degrees. The angle between the lighting sidewall 410 and the first side surface 110 is more than about 0 degree and less than about 90 degrees.

An entire size of the backlight assembly 900 may be reduced. For example, a size of the second receiving container 400 is reduced according as the inclined angle "α" of the lighting sidewall 410 is closed to about 0 degree. Where the inclined angle "α" of the lighting sidewall 410 is closed to about 0 degree, an amount of the light supplied to the first side surface 110 through the lighting sidewall 410 decreases.

The entire size of the backlight assembly 900 may be enlarged. For example, the size of the second receiving container 400 is enlarged according as the inclined angle "α" of the lighting sidewall 410 is closed to about 90 degrees. Where the inclined angle "α" of the lighting sidewall 410 is closed to about 90 degrees, the amount of the light supplied to the first side surface 110 through the lighting sidewall 410 increases.

The inclined angle "α" of the lighting sidewall 410 is preferably set into an angle appropriate to reduce the size of the second receiving container 400 and increase the amount of the light supplied to the first side surface 110 of the light guide plate 110. In preferred embodiments of the present invention, the inclined angle "α" of the lighting sidewall 410 with respect to the first side surface 110 is set into about 45 degrees.

Where the inclined angle "α" is about 45 degrees, the lighting sidewall 410 may be easily damaged by an impact from the external. In order to maintain a shape of the lighting sidewall 410, the first and the third sidewalls 352 and 356 are provided with first and second end portions 352a and 356a, respectively. Each of the first and second end portions 352a and 356a are inclined to the lighting sidewall 410 at an inverse angle of the inclined angle "α".

For instance, where the inclined angle "α" of the lighting sidewall 410 is about 145 degrees with respect to the bottom surface 450 of the second receiving container 400, the first and second end portions 352a and 356a are formed to have an inclined angle of about 315 degrees with respect to the bottom surface 450 of the second receiving container 400.

The second receiving container 400 further includes a reflecting member 415 for increasing an inclining efficiency of the external light on the first side surface 110 of the light guide plate 100. The reflecting member 415 is disposed on the lighting sidewall 410 to face the first side surface 110 of the light guide plate 100.

Embodiment 2

Figure 3:
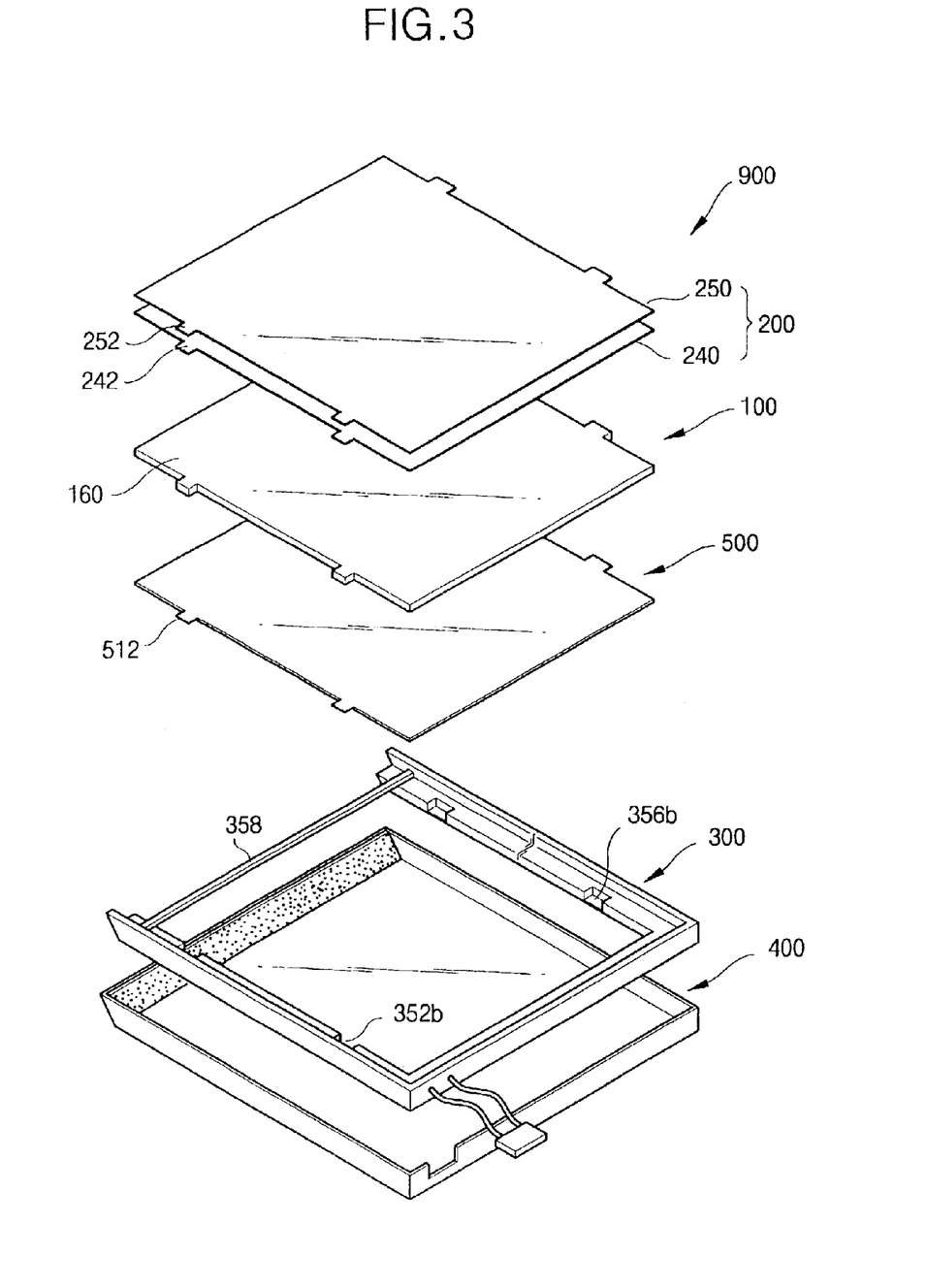
FIG. 3 is an exploded perspective view showing a backlight assembly according to a second embodiment of the present invention.

FIG. 3 is an exploded perspective view showing a backlight assembly according to a second embodiment of the present invention.

A backlight assembly 900 comprises a light guide plate 100, lamp 340, first receiving container 300 and second receiving container 400. The backlight assembly 900 provides the external light and artificial light to the LCD panel to display the image. In preferred embodiments of the present invention, the backlight assembly 900 further comprises an optical sheet 200 and a reflecting plate 500 in order to display high quality image.

The optical sheet 200 comprises a diffusion sheet 240 and a prism sheet 250. The diffusion sheet 240 is disposed on the light emitting surface 160 of the light guide plate 100 to uniformly maintain brightness of the light emitted from the light emitting surface 160. The prism sheet 250 is disposed on the diffusion sheet 240 to control a direction and a visual angle of the light emitted from the diffusion sheet 240. The reflecting plate 500 is disposed under the light guide plate 100 to reflect the light leaked from the light reflecting surface 150 to the light guide plate 100.

The diffusion sheet 240 is provided with a plurality of third fixing protrusions 242 partially extended from end portions thereof. The prism sheet 250 is provided with a plurality of fourth fixing protrusions 252 partially extended from end portions thereof. The third and fourth fixing protrusions 242 and 252 are received in the first and second fixing recesses 352b and 356b of the first receiving container 300, respectively, when the diffusion and prism sheets 240 and 250 are received in the first receiving container 300.

The backlight assembly 900 receives the external light through the lighting sidewall 410 of the second receiving container 400 and the first side surface 110 of the light guide plate 100 and receives the artificial light emitted from the lamp 340 through the second side surface 120 of the light guide plate 100. The external light and artificial light are reflected from the light reflecting surface 150 of the light guide plate 100 and emitted through the light emitting surface 160 of the light guide plate 100.

Embodiment 3

Figure 4:
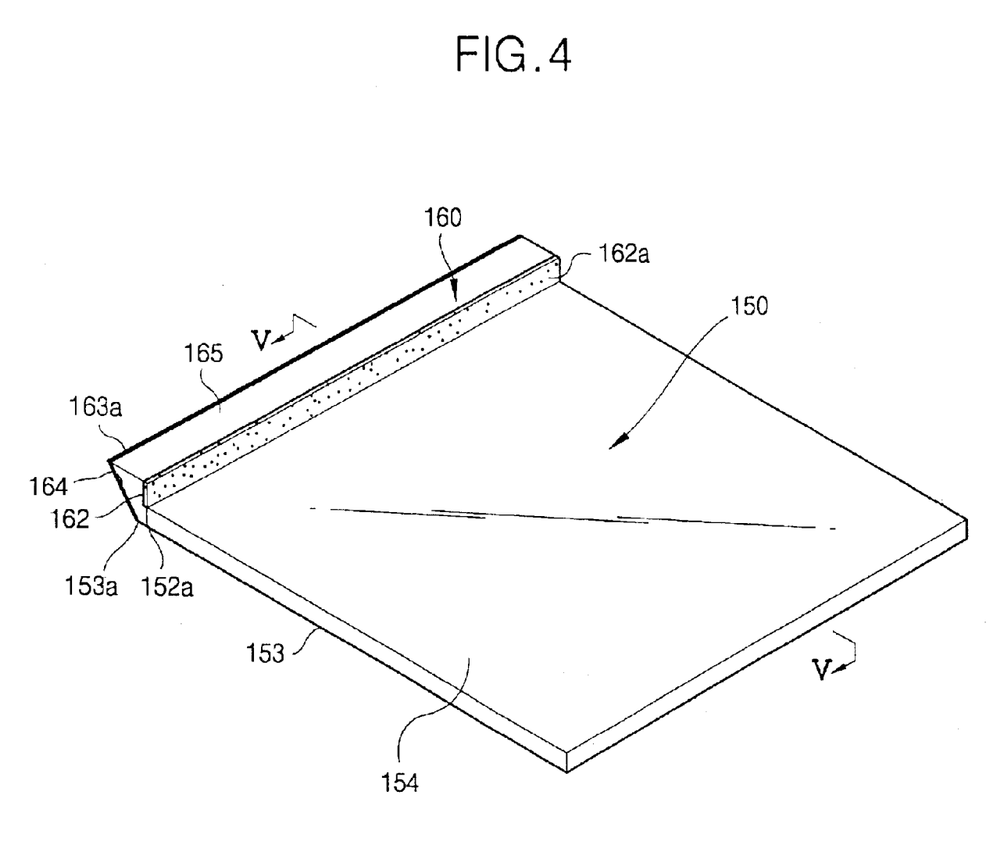
FIG. 4 is a perspective view showing a light guide plate according to a third embodiment of the present invention.
Figure 5:
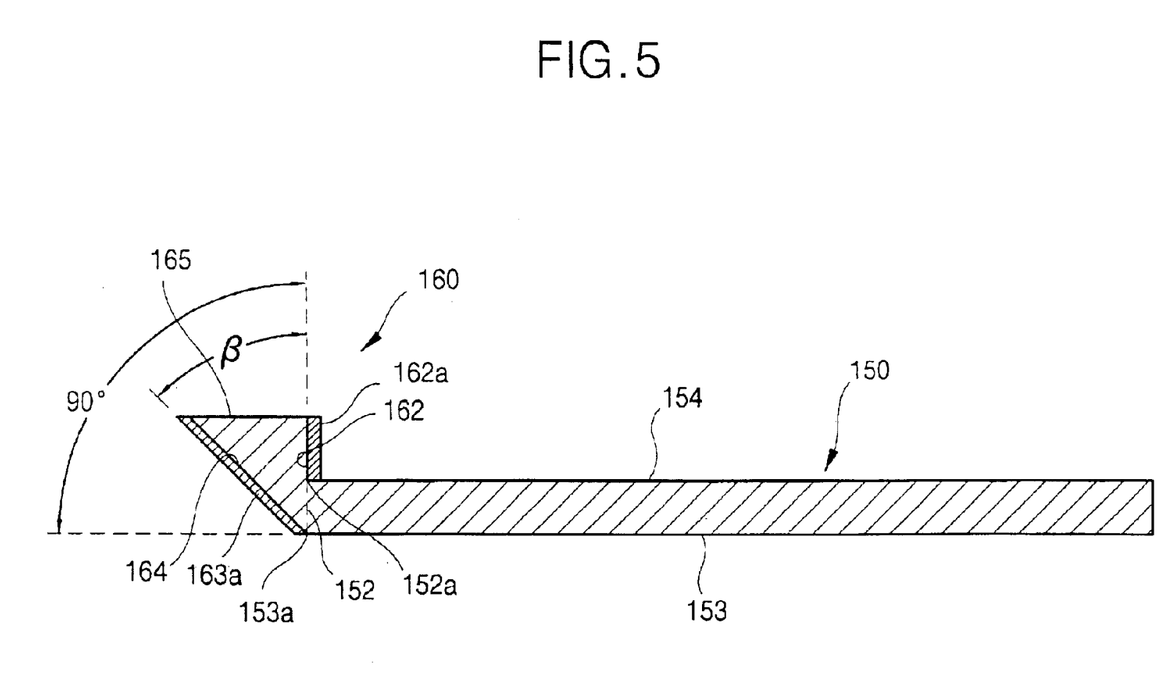
FIG. 5 is a cross-sectional view taken along the line V—V for showing the light guide plate shown in FIG. 4.

FIG. 4 is a perspective view showing a light guide plate according to a third embodiment of the present invention. FIG. 5 is a cross-sectional view taken along the line V—V for showing the light guide plate shown in FIG. 4.

A light guide plate 150 further includes an external light-lighting body 160 disposed on a first side surface 152 of the light guide plate 150.

The external light-lighting body 160 includes a first light reflecting surface 162, a second light reflecting surface 164, and a lighting surface 165.

The first light reflecting surface 162 is extended from a first edge portion 152a where a light emitting surface 154 of the light guide plate 150 comes in contact with the first side surface 152 thereof toward an upper portion of the light emitting surface 154. The first light reflecting surface 162 is perpendicular to the light emitting surface 154 and parallel to the first side surface 152. The second light reflecting surface 164 is extended from a second edge portion 153a where a light reflecting surface 153 of the light guide plate 150 comes in contact with the first side surface 152 thereof. The second light reflecting surface 164 is inclined to the first side surface 110 at an angle of β. For instance, the second light reflecting surface 164 is inclined parallel to the lighting sidewall 410 of the second receiving container 400. The lighting surface 165 connects between the first and second light reflecting surfaces 162 and 163.

The first light reflecting surface 162 reflects an external light (that is not inclined on the second light reflecting surface 164) to the second reflecting surface 164 so as to increase an amount of the external light supplied to the light guide plate 150.

The external light-lighting body 160 may further includes a first light reflecting sheet 162a disposed on the first light reflecting surface 162 to reduce an amount of the external light leaked from the first light reflecting surface 162. Further, the external light-lighting body 160 may further includes a second light reflecting sheet 163a disposed on the second light reflecting surface 164 to reduce an amount of the external light leaked from the second light reflecting surface 164.

Embodiment 4

Figure 6:
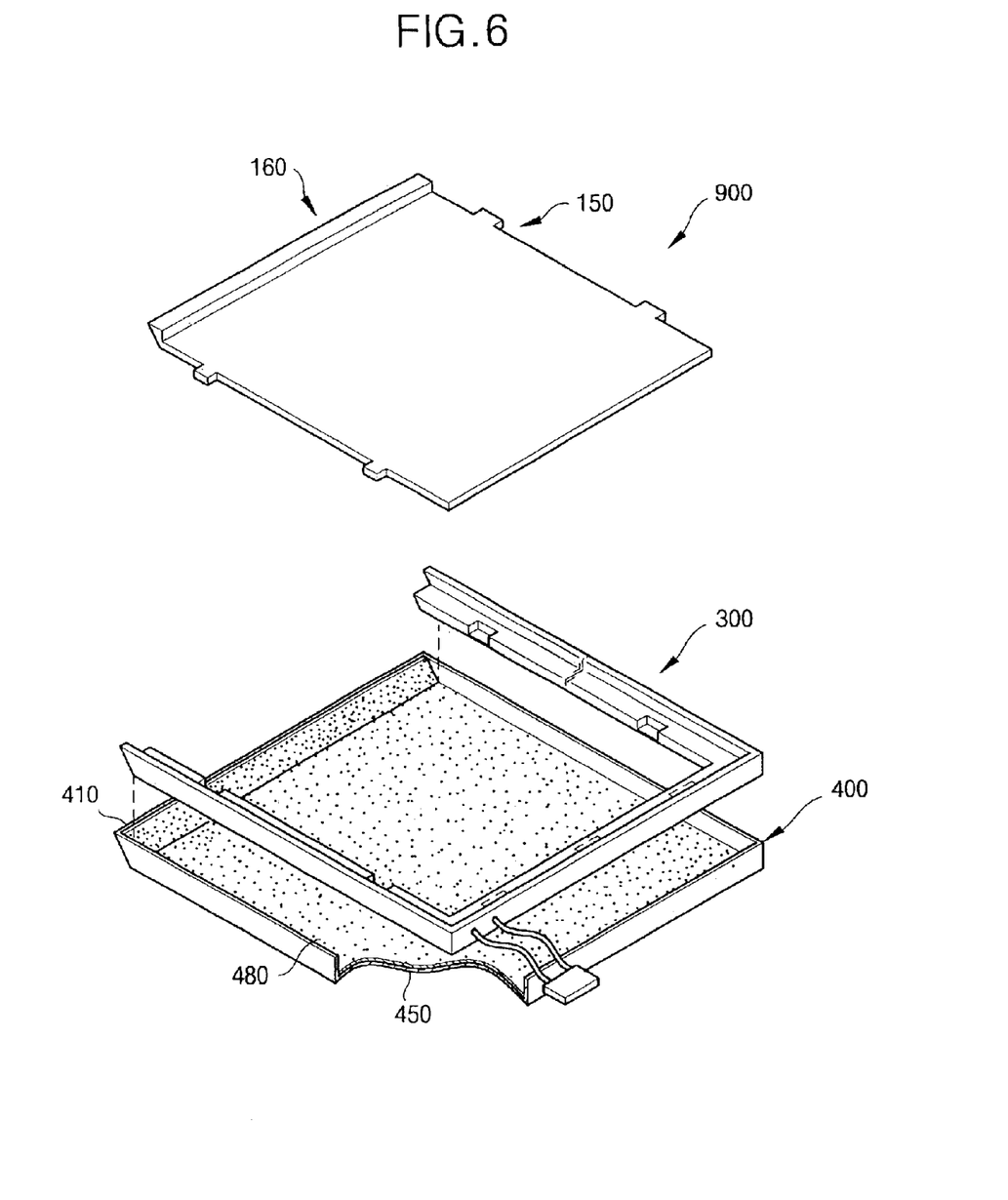
FIG. 6 is an exploded perspective view showing a backlight assembly according to a fourth embodiment of the present invention.

FIG. 6 is an exploded perspective view showing a backlight assembly according to a fourth embodiment of the present invention.

Referring to FIG. 6, a backlight assembly 900 further includes a light reflecting sheet 480 disposed over the lighting sidewall 410 and bottom surface 450 of the second receiving container 400. Advantageously, a number of steps for assembling the backlight assembly 900 may be reduced by disposing the light reflecting sheet 480 on the lighting sidewall 410 and bottom surface 450. Further, a reflecting plate (for example, the reflecting plate 500 of FIG. 3) may be removed in the embodiment, a number of parts of the backlight assembly 900 may be reduced, thereby reducing an entire thickness of the backlight assembly 900.

Embodiment 5

Figure 7:
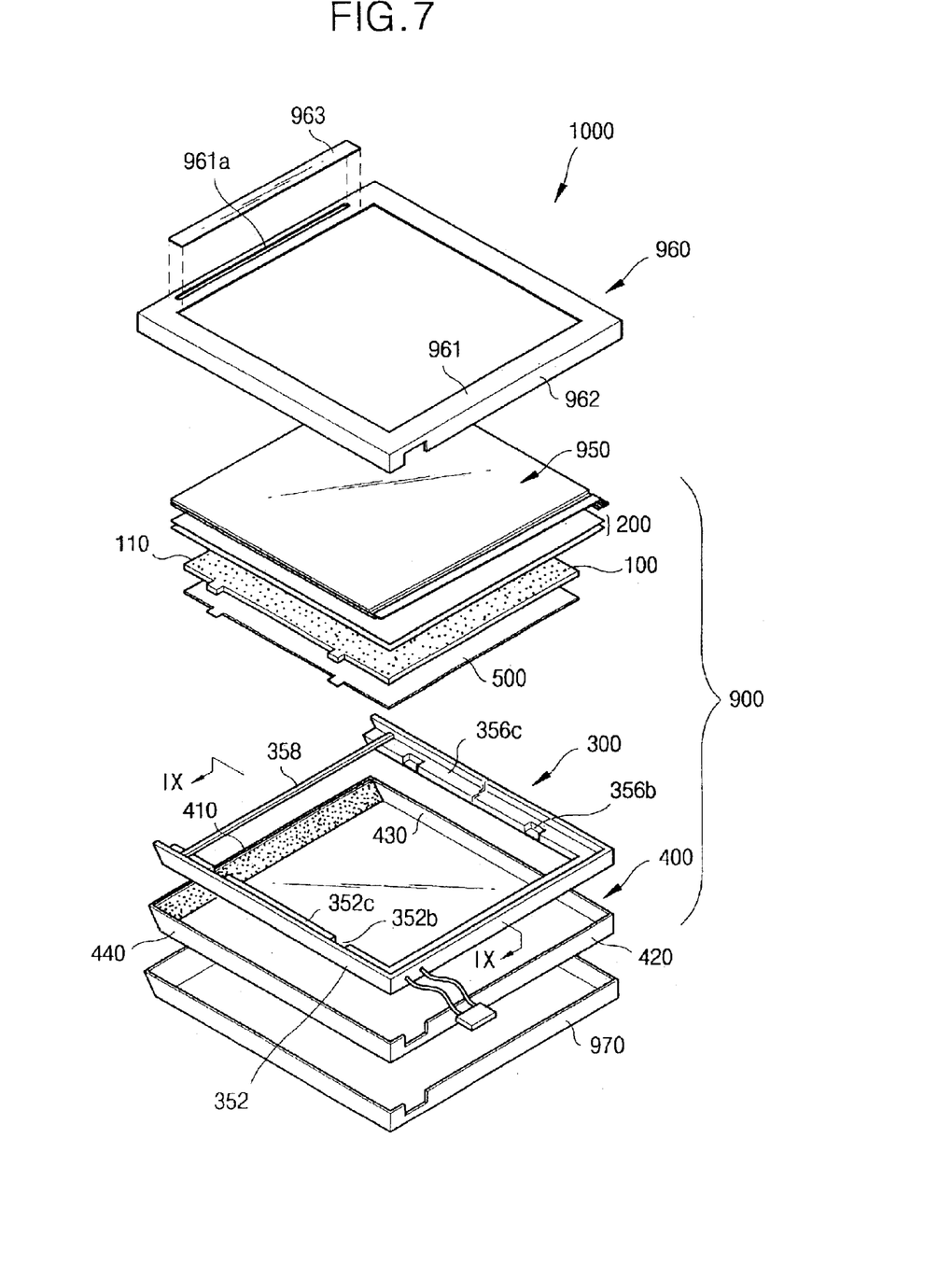
FIG. 7 is an exploded perspective view showing an LCD apparatus according to a fifth embodiment of the present invention.
Figure 8:
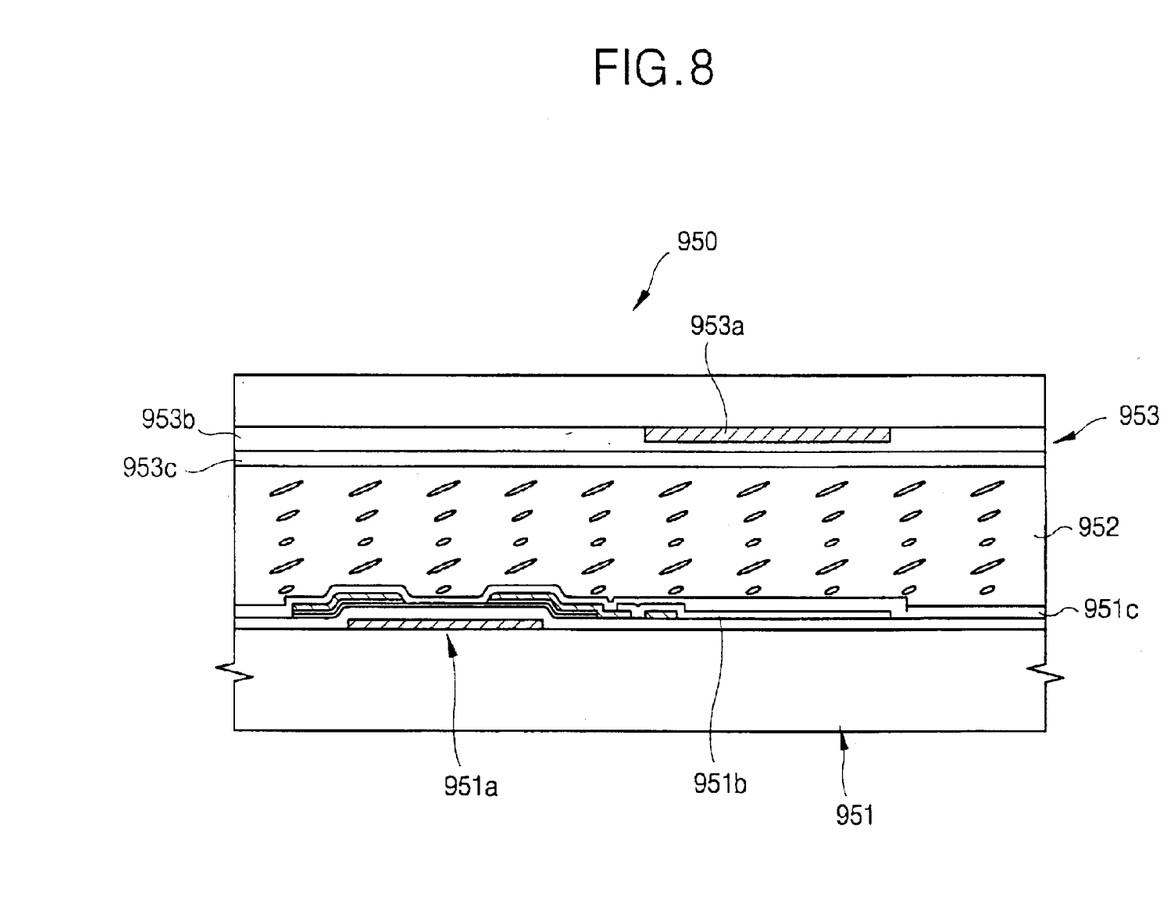
FIG. 8 is a cross-sectional view showing the LCD panel assembly shown in FIG. 7.

FIG. 7 is an exploded perspective view showing an LCD apparatus according to a fifth embodiment of the present invention. FIG. 8 is a cross-sectional view showing the LCD panel assembly shown in FIG. 7.

An LCD apparatus 1000 comprises a backlight assembly 900, an LCD panel assembly 950 received in the backlight assembly 900, a chassis 960 and a lower case 970 for combining the backlight assembly 900 to the LCD panel assembly 950.

The LCD panel assembly 950 comprises a reflective LCD panel assembly, a transmissive LCD panel assembly or a transreflective LCD panel assembly. In a preferred embodiment of the present invention, the transmissive LCD panel assembly is employed as the LCD panel assembly 950.

The transmissive LCD panel assembly 950 comprises a TFT (thin film transistor) substrate 951, a liquid crystal 952, and a color filter substrate 953.

The TFT substrate 951 comprises a transparent glass substrate. For example, the TFT substrate 951 comprises a plurality of TFTs 951a disposed on the substrate 951 in a matrix configuration, a pixel electrode 951b for receiving a power voltage from the TFTs 951a, and a first alignment layer 951c.

The color filter substrate 953 faces the TFT substrate 951. The color filter substrate 953 comprises a color filter 953a disposed on a transparent glass substrate, a common electrode 953b entirely disposed on the transparent glass substrate to cover the color filter 953a, and a second alignment layer 953c. The color filter 953a faces the pixel electrode 951b of the TFT substrate 951.

The liquid crystal 952 is interposed between the TFT substrate 951 and color filter substrate 953. In order to interpose the liquid crystal 952 between the TFT substrate 951 and color filter substrate 953, the TFT substrate 951 is separated from the color filter substrate 953 in a predetermined distance. A spacer (not shown) and a sealant (not shown) may be formed between the TFT substrate 951 and color filter substrate 953 is maintained the predetermined distance.

The transmissive LCD panel assembly 950 is received in the first receiving container 300 of the backlight assembly 900. The transmissive LCD panel assembly 950 is disposed on the first and second steps 352c and 356c of the first receiving container 300. The reflecting plate 500, light guide plate 100 and optical sheet 200 are disposed under the transmissive LCD panel assembly 950.

The chassis 960 comprises a first surface 961 having a rectangular frame shape to expose an effective display area of the transmissive LCD panel assembly 950 and a second surface 962 extended from an edge of the first surface 961 and perpendicular to the first surface 961. The second surface 962 of the chassis 960 is outwardly combined to the fourth to sixth sidewalls 420, 430 and 440 of the second receiving container 400.

The first receiving container 300 prevents the transmissive LCD panel assembly 950 from being moved in a horizontal direction. The chassis 960 prevents the transmissive LCD panel assembly 950 from being moved in a vertical direction. Also, the chassis 960 may prevent an edge portion of the transmissive LCD panel assembly 950 from being damaged and remove a static electricity of the transmissive LCD panel assembly 950.

Figure 9:
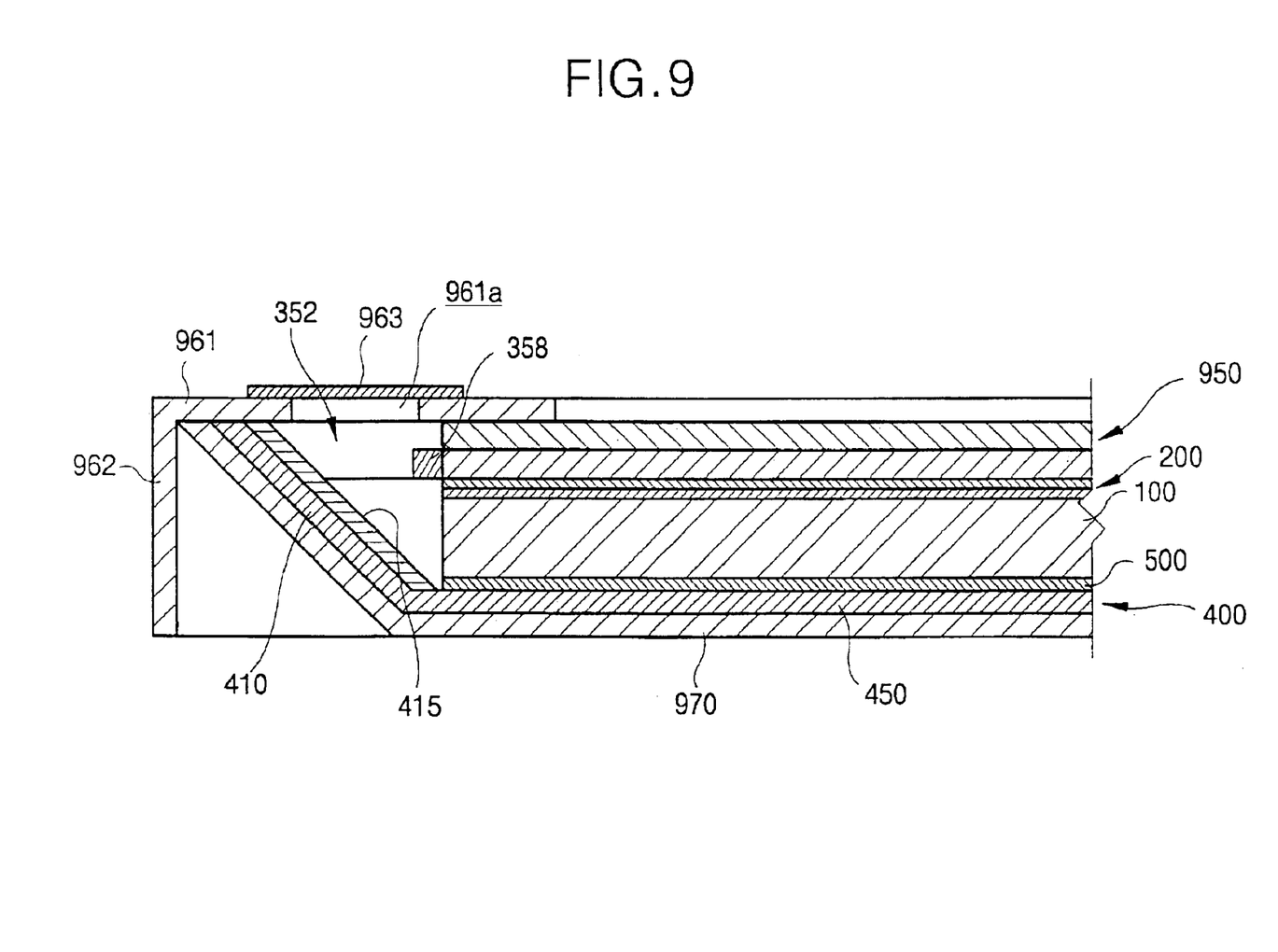
FIG. 9 is a cross-sectional view showing the LCD apparatus shown in FIG. 7.

FIG. 9 is a cross-sectional view showing the LCD apparatus shown in FIG. 7.

Referring to FIG. 9, the first surface 961 of the chassis 960 is provided with an external light-inducting window 961a for inducting the external light into the lighting sidewall 410 of the second receiving container 400 of the backlight assembly 900. The external light is supplied to the lighting sidewall 410 and first side surface 110 of the light guide plate 100 through the external light-inducting window 961a. Also, the chassis 960 further comprises a sheet 963 disposed on the external light-inducting window 961a so as to intercept a foreign substance flowed in the LCD apparatus 1000 through the external light-inducting window 961a.

Embodiment 6

Figure 10:
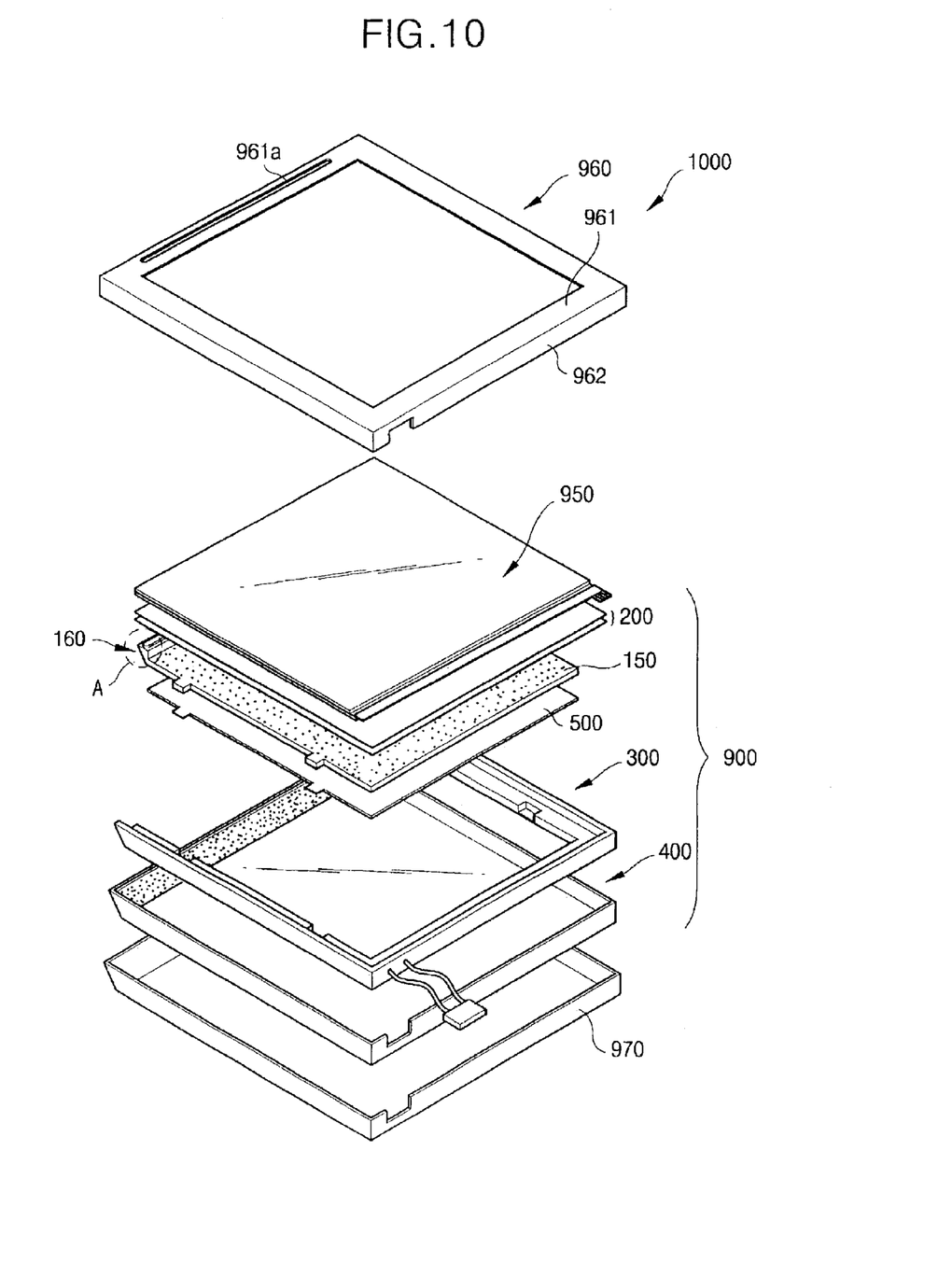
FIGS. 10 to 12 are schematic views showing an LCD apparatus according to a sixth embodiment of the present invention.
Figure 11:
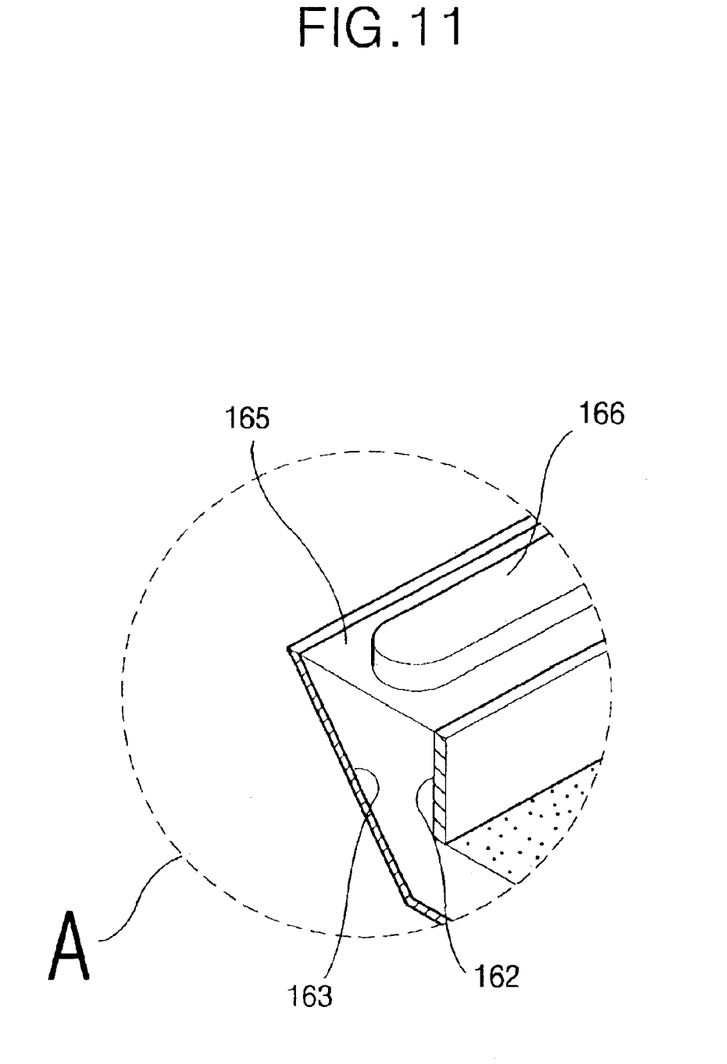
Figure 12:
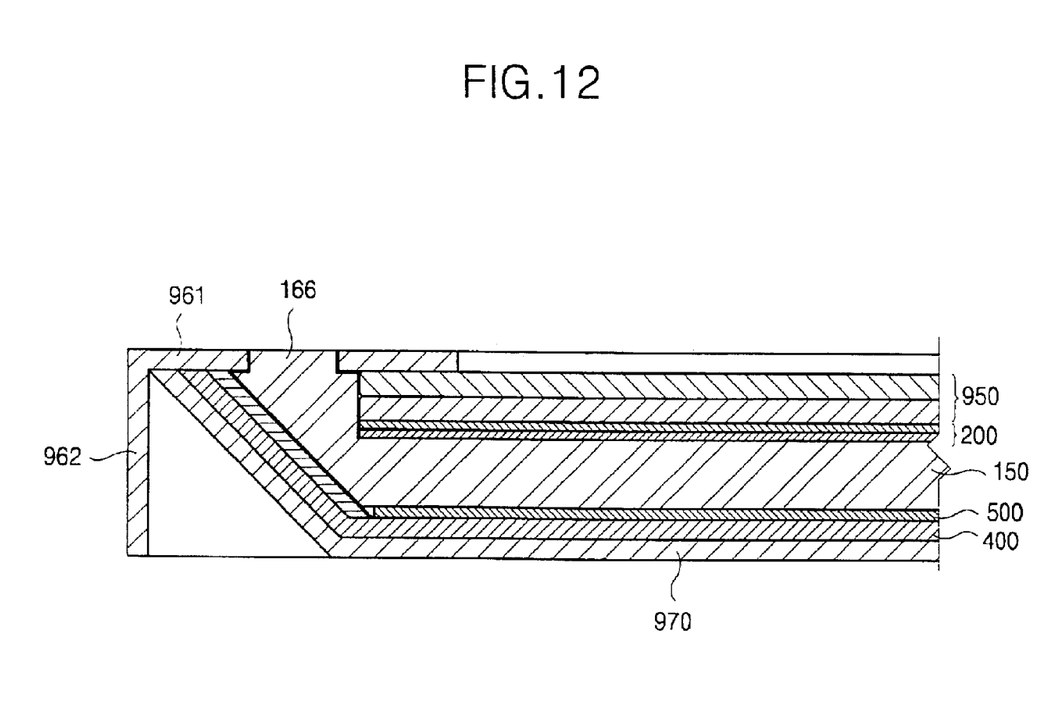

FIGS. 10 to 12 are schematic views showing an LCD apparatus according to a sixth embodiment of the present invention.

According to a preferred embodiment of the present invention, a foreign substance (which enters the LCD apparatus 1000 through the external light-inducting window 961a) can be intercepted by partially transforming a shape of the external light-lighting body 160 shown in FIG. 4). The external light-lighting body 160 is provided with a sealing protrusion 166 disposed on the lighting surface 165. The sealing protrusion 166 is formed by partially protruding the upper surface of the lighting surface 165.

The sealing protrusion 166 has a size identical to that of the external light-inducting window 961a and is inserted into the external light-inducting window 961a. Thus, the LCD apparatus 1000 can prevent the foreign substance from being flowed into the LCD apparatus 1000.

Advantageously, the backlight assembly and LCD apparatus according to preferred embodiments of the present invention simultaneously supply an external and artificial light (e.g., a lamp light) to the LCD panel assembly. Thus, the LCD apparatus increases brightness of the light and reduces the number of parts and power consumption.

Although the LCD panel assembly according to preferred embodiments of the present invention comprises the transmissive LCD apparatus, the reflective and transreflective LCD panel assemblies can be applied to the LCD panel assembly of the present invention. For example, a reflective LCD apparatus according to a preferred embodiment of the present invention may have a light guide plate disposed on a reflective LCD panel assembly for receiving an external light and artificial light.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A backlight assembly comprising:
   a light guide plate including a first side surface for receiving an external light, a second side surface for receiving an artificial light, a third side surface and a fourth side surface for connecting the first side surface to the second side surface, a light reflecting surface for reflecting the external light and the artificial light, and a light emitting surface facing the light reflecting surface;

a first receiving container for receiving the light guide plate and for supplying the artificial light to the second side surface, the first receiving container comprising first, second, and third sidewalls for covering the second to fourth side surfaces of the light guide plate; and a second receiving container comprising a bottom surface, fourth, fifth, and sixth sidewalls for covering the first, second, and third sidewalls, and a light sidewall configured to supply the external light to the first side surface, wherein the lighting sidewall is extended from the bottom surface, inclined with respect to the first side surface, and connected between the fifth and the sixth sidewalls.

2. The backlight assembly of claim 1, further comprising a reflecting means disposed between the lighting sidewall and the first side surface, the reflecting unit configured to reflect the external light to the first side surface.

3. The backlight assembly of claim 2, wherein the reflecting unit comprises a light reflecting sheet attached to the lighting sidewall.

4. The backlight assembly of claim 1, wherein the second and the third sidewalls of the first receiving container comprise end portions parallel to the lighting sidewall.

5. The backlight assembly of claim 1, wherein the lighting sidewall is inclined with respect to the first side surface in a range of about 0 degree to about 90 degrees.

6. The backlight assembly of claim 5, wherein the lighting sidewall is inclined with respect to the first side surface at about 45 degrees.

7. The backlight assembly of claim 1, wherein the first receiving container comprises a plurality of fixing recesses disposed on the second and third sidewalls, and wherein the light guide plate comprises a plurality of first fixing protrusions corresponding to the fixing recesses.

8. The backlight assembly of claim 7, further comprising:
a reflecting plate disposed under the light guide plate, the reflecting plate comprising a plurality of second fixing protrusions corresponding to the fixing recesses; and
an optical sheet disposed on the light guide plate, the optical sheet comprising a plurality of third fixing protrusions corresponding to the fixing recesses.

9. The backlight assembly of claim 1, wherein the light guide plate further comprises an external light-lighting body configured to change a light path of the external light so as to supply the external light to the first side surface.

10. The backlight assembly of claim 9, wherein the external light-lighting body comprising:
a first light reflecting surface extended from a first edge portion where the light emitting surface of the light guide plate comes in contact with the first side surface, the first light reflecting surface being perpendicular to the light emitting surface and parallel to the first side surface;
a second light reflecting surface extended from a second edge portion where the light reflecting surface of the light guide plate comes in contact with the first side surface, the second light reflecting surface being inclined parallel to the lighting sidewall; and
a lighting surface for connecting the first and the second light reflecting surfaces.

11. The backlight assembly of claim 10, wherein the external light-lighting body further comprises a reflecting sheet for reflecting the external light, the reflecting sheet being disposed on the first light reflecting surface.

12. The backlight assembly of claim 10, wherein the external light-lighting body further comprises a reflecting sheet configured to reflect the external light, the reflecting sheet being disposed on the second light reflecting surface.

13. The backlight assembly of claim 1, further comprising a lamp for generating the artificial light, the lamp being disposed adjacent to the first sidewall.

14. The backlight assembly of claim 1, wherein the second receiving container guides the eternal light to the light guide plate.

15. The backlight assembly of claim 1, wherein the lighting sidewall is inclined with respect to the first side surface so as to increase an amount of the external light supplied to the light guide plate.

16. A backlight assembly comprising:
a light guide plate including an external light-lighting body having a light reflecting side surface configured to reflect an external light from a first direction to a second direction, a light receiving surface configured to receive an artificial light from a third direction, a light reflecting surface for reflecting the external light and the artificial light to a fourth direction, at least one side surface adjacent to the light receiving surface, and a light emitting surface for emitting the external light and the artificial light having the fourth direction;
a first receiving container including a first sidewall for covering the light receiving surface and the side surface, wherein the first receiving container supplies the artificial light to the light receiving surface;
a second receiving container including a bottom surface, a second sidewall extended from the bottom surface, and a lighting sidewall extended from the bottom surface and connected to the second sidewall, wherein the lighting sidewall is inclined with respect to the bottom surface; and
a light reflecting means disposed over the lighting sidewall and the bottom surface.

17. The backlight assembly of claim 16, wherein the light reflecting means is a light reflecting sheet.

18. The backlight assembly of claim 16, wherein the second receiving container guides the external light to the light guide plate.

19. The backlight assembly of claim 16, wherein the lighting sidewall is inclined with respect to the first side surface so as to increase an amount of the external light supplied to the light guide plate.

20. A backlight assembly comprising:
a light guide plate configured to receive an external light;
a first receiving container configured to receive the light guide plate, the first receiving container comprising first, second, and third sidewalls to form a 'U' shape; and
second receiving container comprising sidewalls to cover she first receiving container,
wherein the first receiving container receives the external light between the first and third sidewalls, and the second receiving container comprises a bottom surface, fourth, fifth, and sixth sidewalls configured to cover the first second, and third sidewalls, and a lighting sidewall configured to supply the external light to the light guide plate
and wherein the lighting sidewall is extended from the bottom surface, inclined with respect to the first side surface, and connected between the fifth and sixth side walls.

21. The backlight assembly of claim 20, wherein the first receiving container further comprises a connector bar configured to connect the first and third sidewalls.

22. The backlight assembly of claim 20, wherein the first and second sidewalls comprise a first step having a first fixing recess and a second step having a second fixing recess, respectively, and the light guide plate comprises a first fixing protrusion corresponding to the first fixing recess and a second fixing protrusion corresponding to the second fixing recess.

23. A backlight assembly comprising:

a light, guide plate including a first side surface configured to receive an external light, a second side surface facing the first side surface, third and fourth side surfaces configured to connect the first and second side surfaces, a light reflecting surface configured to reflect the external light and the artificial light, and a light emitting surface facing the light reflecting surface;

an external light-lighting body disposed on the first side surface to change a light path of the external light so as to supply the external light to the first side surface, the external light-lighting body including a, first light reflecting surface extended from a first edge portion where the light emitting surface of the light guide plate comes in contact with the first side surface, a second light reflecting surface extended from a second edge portion where the light reflecting surface of the light guide plate comes in contact with the first side surface, the second light reflecting surface being inclined with the reflecting surface, and a lighting surface configured to connect the first and second light reflecting surfaces; and a receiving container configured to receive the light guide plate and the external light-lighting body.

24. The backlight assembly of claim 23, wherein the first light reflecting surface is substantially perpendicular to the light emitting surface and parallel to the first side surface.

* * * * *